US009235417B2

(12) United States Patent
Brandt et al.

(10) Patent No.: US 9,235,417 B2
(45) Date of Patent: Jan. 12, 2016

(54) REAL TIME INSTRUCTION TRACING COMPRESSION OF RET INSTRUCTIONS

(75) Inventors: Jason Brandt, Austin, TX (US); Jonathan Tyler, Austin, TX (US); John Zurawski, Boxborough, MA (US); Dennis Lastor, Driftwood, TX (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 13/992,712

(22) PCT Filed: Dec. 31, 2011

(86) PCT No.: PCT/US2011/068287
§ 371 (c)(1),
(2), (4) Date: Jun. 7, 2013

(87) PCT Pub. No.: WO2013/101251
PCT Pub. Date: Jul. 4, 2013

(65) Prior Publication Data
US 2014/0019733 A1    Jan. 16, 2014

(51) Int. Cl.
*G06F 11/30* (2006.01)
*G06F 9/30* (2006.01)
(52) U.S. Cl.
CPC ............ *G06F 9/30145* (2013.01); *G06F 11/30* (2013.01)
(58) Field of Classification Search
CPC .......................... G06F 11/2236; G06F 11/3648
See application file for complete search history.

(56) References Cited

U.S. PATENT DOCUMENTS

| 5,404,473 | A | * | 4/1995 | Papworth | G06F 9/300018 712/241 |
| 7,260,692 | B1 | * | 8/2007 | Zahavi | G06F 11/3034 710/18 |
| 7,533,251 | B2 | * | 5/2009 | Ubukata | G06F 9/4426 712/227 |
| 7,865,879 | B1 | * | 1/2011 | Kommrusch | G06F 11/2236 717/124 |
| 8,250,542 | B1 | * | 8/2012 | Ball | G06F 11/3636 717/124 |
| 8,484,517 | B2 | * | 7/2013 | Mayer | G60F 11/3476 714/25 |
| 9,003,375 | B2 | * | 4/2015 | Brandt | G06F 11/3466 714/45 |
| 2005/0268177 | A1 | | 12/2005 | John | |
| 2006/0117229 | A1 | * | 6/2006 | Swaine | G06F 11/348 714/45 |
| 2008/0155353 | A1 | | 6/2008 | Craske | |

OTHER PUBLICATIONS

PCT International Search Report for PCT Counterpart Application No. PCT /US2011/068287, 3 pgs., (Oct. 12, 2012).

(Continued)

*Primary Examiner* — Cheng-Yuan Tseng
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing Real Time Instruction Tracing compression of RET instructions For example, in one embodiment, such means may include an integrated circuit having means for initiating instruction tracing for instructions of a traced application, mode, or code region, as the instructions are executed by the integrated circuit; means for generating a plurality of packets describing the instruction tracing; and means for compressing a multi-bit RET instruction (REturn instruction) to a single bit RET instruction.

30 Claims, 15 Drawing Sheets

(56) References Cited

OTHER PUBLICATIONS

PCT Written Opinion of the International Searching Authority for PCT Counterpart Application No. PCT/US2011/068287, 4 pgs., (Oct. 12, 2012).

PCT Notification concerning Transmittal of International Preliminary Report on Patentability (Chapter I of the Patent Cooperation Treaty) for PCT Counterpart Application No. PCT/US2011/068287, 6 pgs., (Jul. 10, 2014).

* cited by examiner

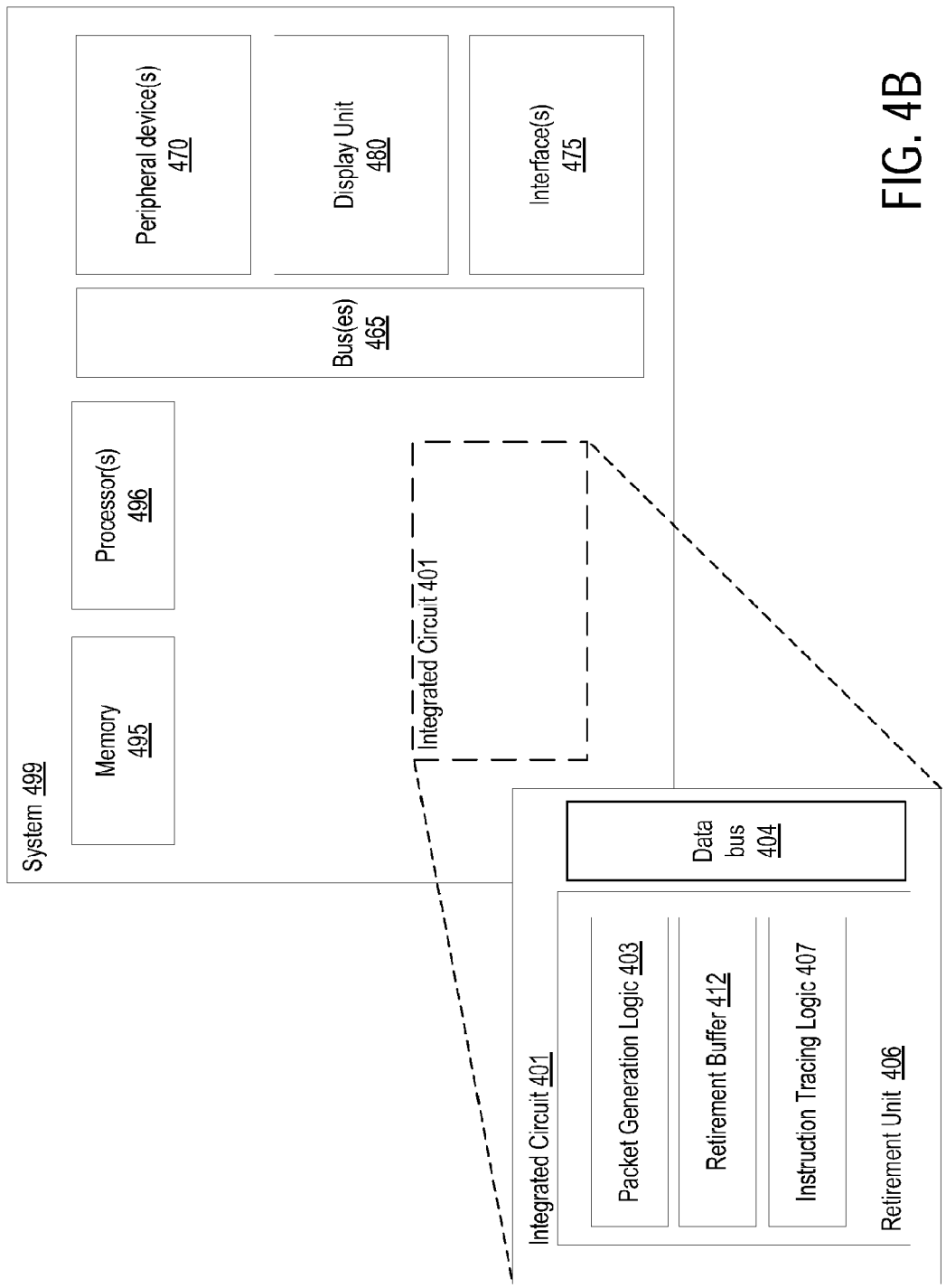

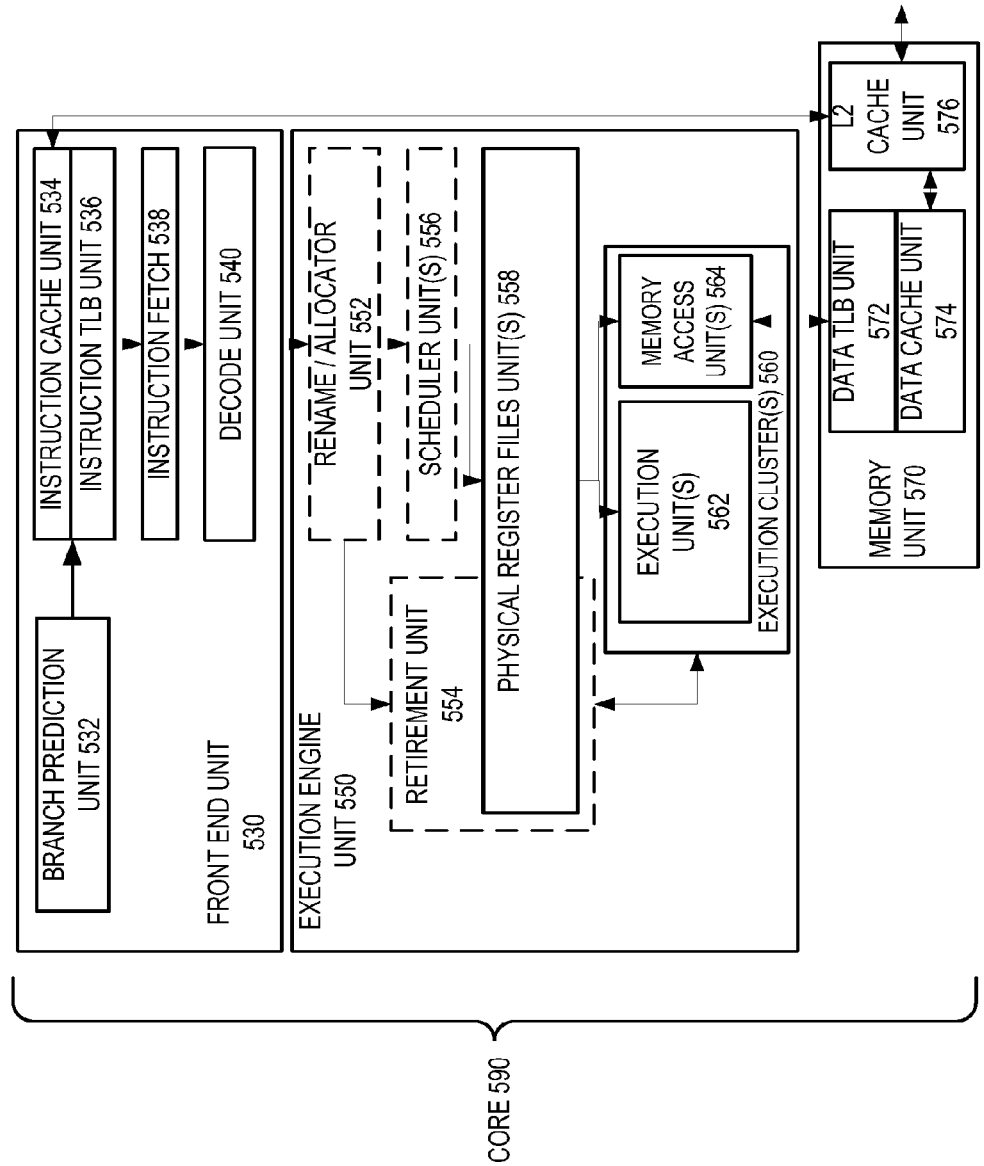

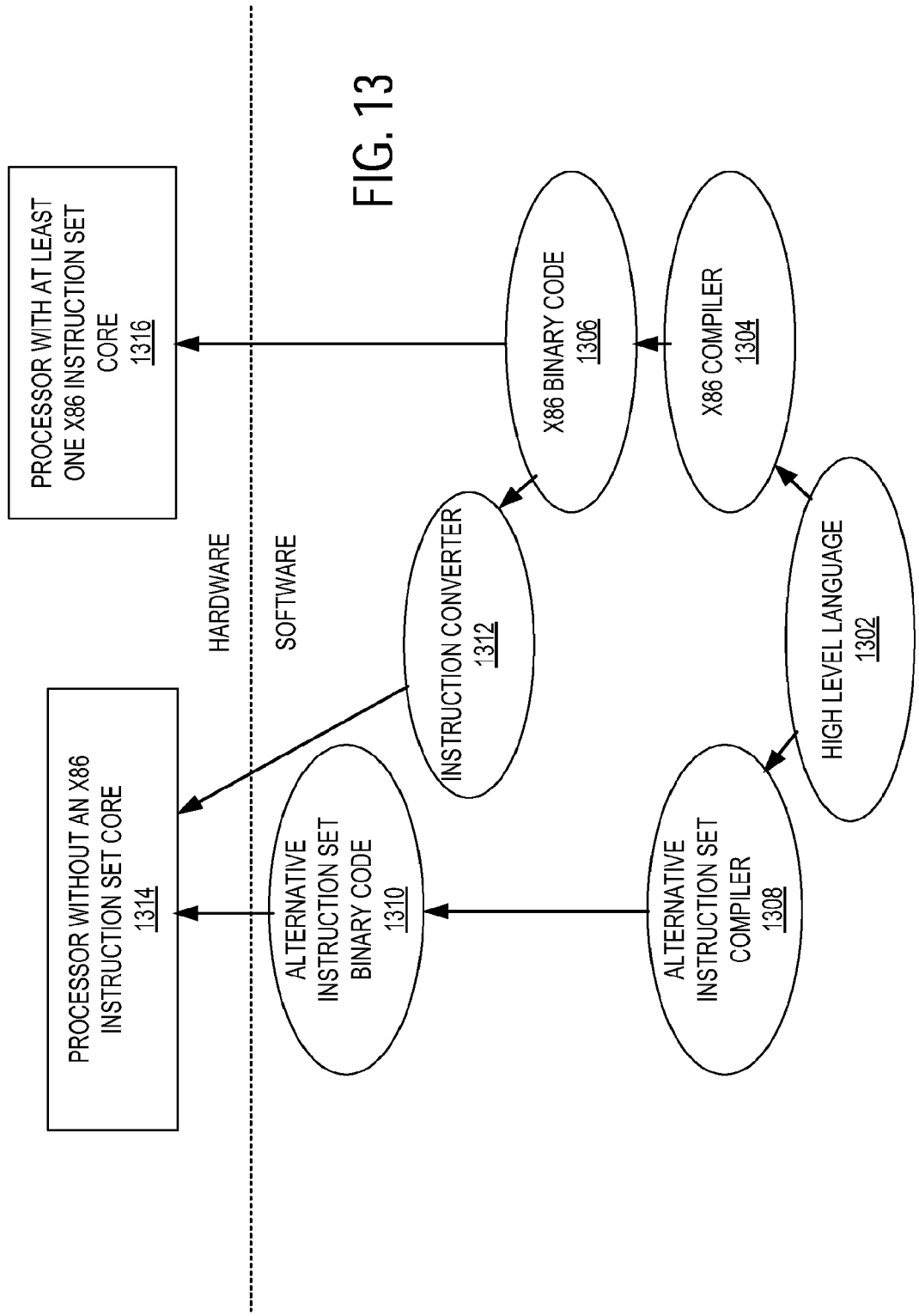

REAL TIME INSTRUCTION TRACING COMPRESSION OF RET INSTRUCTIONS

CROSS-REFERENCE TO RELATED APPLICATION

This patent application is a U.S. National Phase Application under 35 U.S.C. §371 of International Application No. PCT/US2011/068287, filed Dec. 31, 2011, entitled REAL TIME INSTRUCTION TRACING COMPRESSION OF RET INSTRUCTIONS.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing Real Time Instruction Tracing (RTIT) compression of RET (RETurn) instructions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Real Time Instruction Tracing (RTIT) is a debug feature that logs what instructions are being executed by a processor. RTIT explains what instructions were executed by a processor by generating packets with specifying target information of indirect jumps. Because the near RET (RETurn) instructions are usually the most frequent indirect jump, much of the trace output and bandwidth is consumed by packets generated by RET instructions. This bandwidth contributes to computational overhead which does not directly solve a problem or task handled by the processor. Conventional RTIT mechanisms provide no means by which such wasteful overhead may be reduced.

The present state of the art may therefore benefit from systems and methods for implementing Real Time Instruction Tracing (RTIT) compression of RET (Return) instructions as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4B shows a diagrammatic representation of a system in accordance with which embodiments may operate, be installed, integrated, or configured;

FIG. 5B is a block diagram illustrating both an exemplary embodiment of an in-order architecture core and an exemplary register renaming, out-of-order issue/execution architecture core to be included in a processor in accordance with described embodiments;

FIG. 13 illustrates a system to translate instructions according to one embodiment.

DETAILED DESCRIPTION

Figure 1:
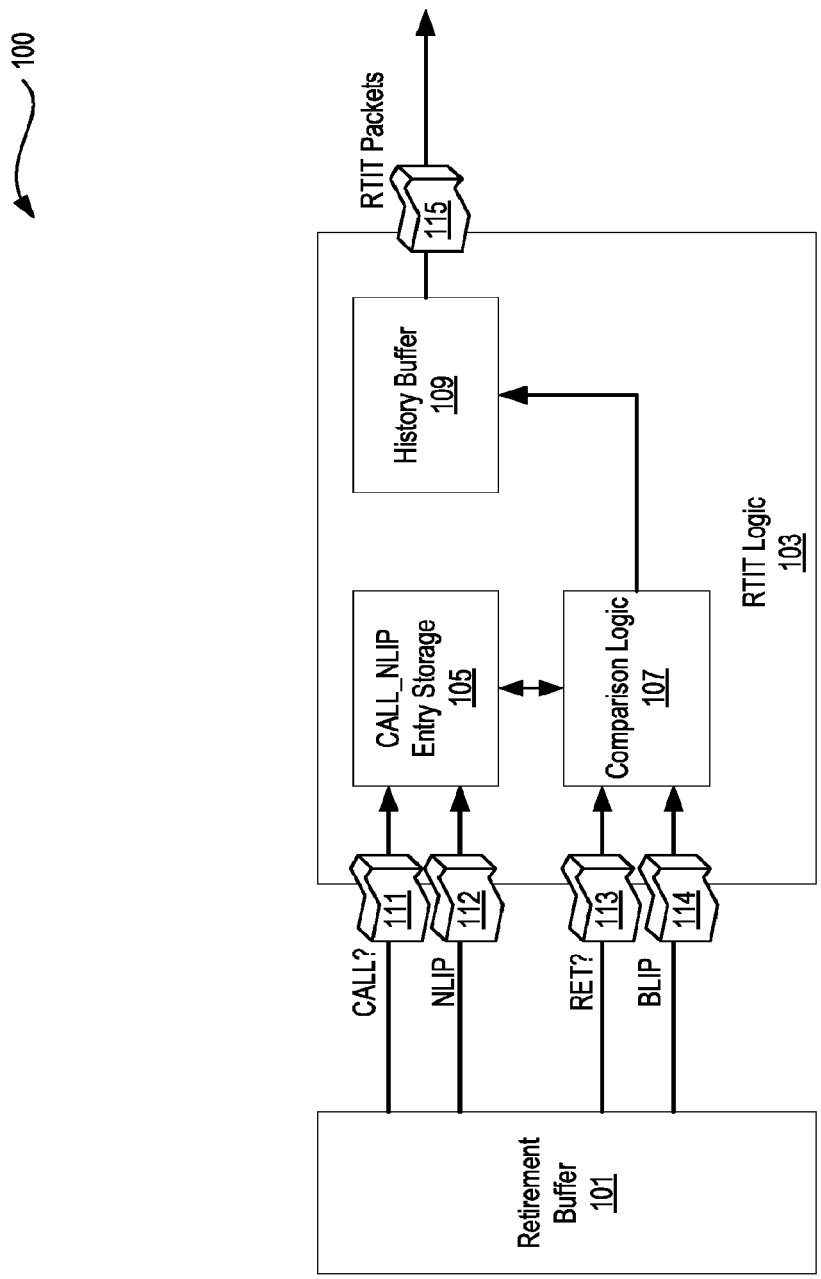
FIG. 1 illustrates an exemplary architecture in accordance with which embodiments may operate.

Described herein are systems and methods for implementing Real Time Instruction Tracing compression of RET instructions. For example, in one embodiment, such means may include an integrated circuit having means for initiating instruction tracing for instructions of a traced application, mode, or code region, as the instructions are executed by the integrated circuit; means for generating a plurality of packets describing the instruction tracing; and means for compressing a multi-bit RET instruction (RETurn instruction) to a single bit RET instruction.

As execution proceeds through the instructions being executed certain events of interest may be configured to trigger the generation of packets through the use of RTIT logic to report additional information about the event. For example, an event such as a conditional jump, a page fault, and so forth may be programmatically configured to generate a packet which says, execution was at location "x" when event "y" occurred, and the jump or fault proceeded to location "z." Sometimes the packet may also contain a subset of this information. For example the packet may only indicate "next conditional jump was taken" which may be used to determine that the jump proceeded to location "z." Additional information may be reported for the event such as when an event occurred in terms of cycle time, wall clock time, and so forth. Maintenance packets having synchronization data may additionally be generated, as well as packets indicating what particular application or entity is running or triggering the designated event (e.g., such as a word processor, a browser, a hypervisor, etc.).

Although conventional Real Time Instruction Tracing technology exists, such technology burdens the processor with additional overhead processing required to generate the necessary instructions which themselves may consume significant bandwidth, thus detracting from other tasks. Moreover, conventional techniques provide no mechanism by which by which such wasteful overhead may be reduced.

It is desirable in certain situations to make Real Time Instruction Tracing operate more efficiently such that the processor may allocate additional resources toward solving a requested computing task rather than processing overhead. RET compression techniques as are taught herein greatly reduce an RTIT trace size by compressing RET packets from up to 56 bits down to 1 bit. The RET packets are necessary to explain what instructions were executed by the processor and thus, an RTIT trace generates packets indicating the target information of indirect jumps. However, if the same information can be provided while consuming less bandwidth, then computational overhead burden for the processor may be reduced significantly.

A single function (or procedure) to be called from multiple places within a program by using a "CALL" instruction. Exiting the function back to the calling program can be done with a "RET" (RETurn) instruction. The CALL instruction is similar to a direct jump that also pushes the RET address onto the stack (in memory). The RET instruction is an indirect jump whose target address is popped from the stack.

The CALL instructions allow control transfers to procedures within the current code segment (near CALL) and in a different code segment (far CALL). Near calls usually provide access to local procedures within the currently running program or task. Far calls are usually used to access operating system procedures or procedures in a different task.

Since near RET instructions are usually the most frequent indirect jumps, much of the trace output and bandwidth is consumed by packets generated by RET. The techniques for implementing Real Time Instruction Tracing compression of RET instructions as are described herein therefore compress the information related to RET to greatly reduce the RTIT trace size. In accordance with the embodiments described below, such compression results in reduction from a normal size of 24 to 56 bits down to a single bit per RET.

Specifically, RET compression uses the fact that near CALL instructions push the instruction point (IP) of the next sequential instruction onto the stack. Typically, there will be a corresponding RET that pops that instruction pointer from the stack and jumps to it thereby causing the execution to continue after call. However, there is no requirement that RETs go to that address. It is possible for the subroutine to adjust their stack pointer (e.g., jumping to the caller of the routine that called them) or for the subroutine to modify the return pointer on the stack. In other words, the common case for a RET is for it to jump to the address pushed onto the stack by the corresponding CALL, but there are cases where a RET will jump to a different address.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate including RTIT architecture that utilizes RET compression. More particularly, retirement buffer 101 interacts with RTIT logic 103 which in turn outputs RTIT packets 115. More specifically, retirement buffer 101 sends a "CALL?" 111 and "NLIP" 112 (e.g., Next Linear Instruction Pointer or "NLIP") to the CALL_NLIP entry storage unit 105 of RTIT logic 103. Retirement buffer 101 further sends "RET?" 113 and "BLIP" 114 (e.g., Branch Linear Instruction Pointer or "BLIP") to comparison logic 107. CALL_NLIP entry storage unit 105 communicates to comparison logic 107 which in turn communicates to history buffer 109 and which generates and outputs the RTIT packets 115 from the RTIT logic 103.

In some embodiments, architecture 100 is part of a retirement unit of within an integrated circuit such as a processor. As shown, a retirement buffer 101 temporarily stores retired instructions. This buffer is communicably interfaced to RTIT logic 103 which itself includes several components whose functions are discussed below.

If the retired instruction was a near CALL, then an entry is made into a CALL_NLIP entry storage unit 105. RET compression, as detailed below, saves the linear address (e.g., (IP/EP+CS.base) or RIP) of the next instruction after a near CALL instruction (illustrated as NLIP or near linear instruction pointer) into a storage mechanism (such as a hardware or software buffer) when the near CALL instruction retires as an entry into the CALL_NLIP entry storage unit 105. This saved address (NLIP) corresponds to the effective address that is pushed onto the stack. In some embodiments, only a single entry is stored. In other embodiments, a multi-entry storage mechanism in place of the CALL_NLIP entry storage unit 105 is used with a head pointer.

When a near RET retires, comparison logic 107 looks at the target address of the retiring RET and compares that against the current CALL_NLIP entry of CALL_NLIP entry storage unit 105 (e.g., top of the stack if a stack is used). The address of the RET is shown as BLIP or branch linear instruction pointer in the figure. If the comparison is valid (e.g., the addresses match), then a "taken" indication is added to the history buffer 109. This indication is a single bit. For example, in some embodiments, when set to "1" then the addresses matched. In some embodiments, this indication is placed in a location that corresponds to the location of the address in the CALL_NLIP entry storage unit 105. That is, there is a correlation between these locations. However, that does not need to be the case. Storing this indication instead of sending out a target IP packet with the address of the RET (which could be between 24-56 bits in size) is a substantial savings.

In some embodiments, if a taken indication fills up the history buffer 109 (sometimes called a "Taken-Not-Taken" or TNT buffer), then a TNT packet is sent out of the RTIT logic 103. For example, if all of the entries of the buffer are labeled taken then a TNT packet is sent out and the valid bits cleared.

In some embodiments, if a buffer overflow happens (retirement buffer 101, CALL_NLIP entries 105, or history buffer 109), then all CALL_NLIP entries are marked as invalid.

Additionally, in some embodiments, all CALL_NLIP entries are marked invalid after Prefetch Stream Buffer (PSB) packets. This allows an analyzing program to understand the trace even if all RTIT output before that PSB packet or stream is lost.

Moreover, in some embodiments, CALL/RET instructions only update CALL_NLIP entries when they are in the right mode and region to generate RTIT packets. For example, a privilege level system such as is found in many x86 architectures (level 0=OS kernel, levels 1 and 2=OS services, and level 3=applications) is used. If a privilege level system is used, then each privilege level typically has its own stack.

This figure does not illustrate RTIT software that is used to interpret the packets sent from RTIT logic 103.

Figure 2:
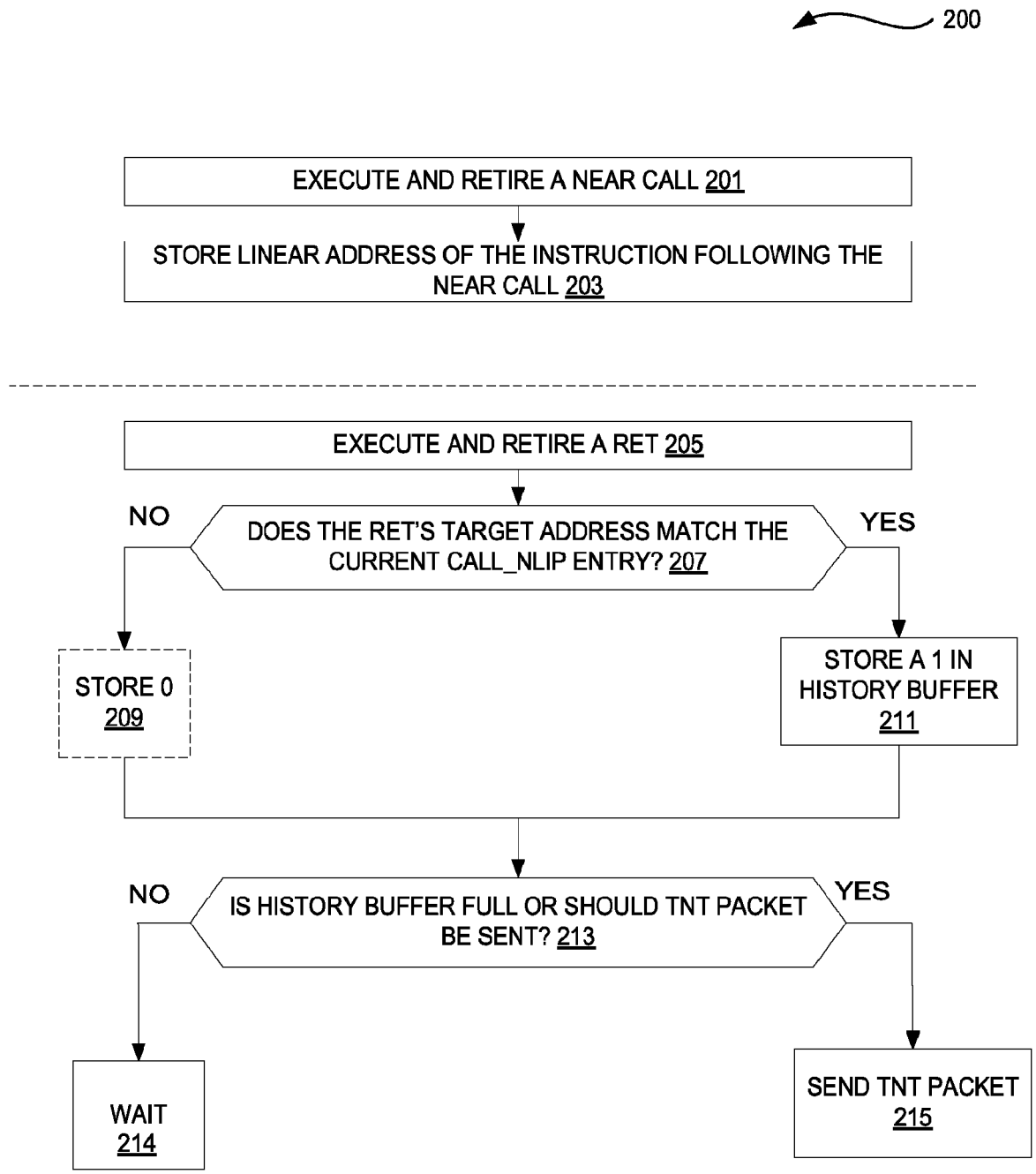
FIG. 2 is a flow diagram illustrating a method for implementing Real Time Instruction Tracing compression of RET instructions in accordance with described embodiments.

FIG. 2 is a flow diagram illustrating a method 200 for implementing Real Time Instruction Tracing compression of RET instructions in accordance with described embodiments. Method 200 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Beginning with block 201, a near CALL is executed and retired. At block 203, a linear address of an instruction that follows the CALL is stored.

At some point later in time, a RET is executed and retired at block 205. A comparison of if the RET's target address matches the address of the current CALL_NLIP entry is made decision point 207. If "no," then processing flow proceeds to block 209 in accordance with some embodiments, and a "0" is stored in a history buffer position corresponding to that entry. In other embodiments, nothing is done above a non-match.

Alternatively, if "yes," the RET's target address matches the address of the current CALL_NLIP entry from decision point 207 then processing advances from block 205 through 207 to block 211 and a "1" is stored in a history buffer position corresponding to that entry. As detailed above, storing a "1" (or an equivalent indication) instead of the RET's target address is a significant savings which reduces the conventionally sized of 24 to 56 bits down to a single bit per RET.

Flow then advances to decision point 213 and a determination of if the history buffer is full or if a TNT packet (e.g., "Taken-Not-Taken" packet) should otherwise be sent is made. If "no," then processing flow proceeds to block 214 and the RTIT waits until this condition is met. Alternatively, if "yes," the a determination is made at decision point 213 that a TNT packet should be sent then processing advances to block 215 and the TNT packet is created and transmitted.

Various architectures may utilized the above describe RET compression including integrated circuits such as those which implement a processor, systems using such integrated circuits, methodologies and techniques for leveraging the described concepts, and so forth. The above RET reduction reduces the intrusiveness of RTIT which prevents the act of using the debug/analysis tool from changing the CPU behavior that needs observing, reduces bandwidth requirements of RTIT which can reduce hardware cost, and allows packing of more RTIT data into a fixed size buffer which gives the RTIT user more information.

Figure 3:
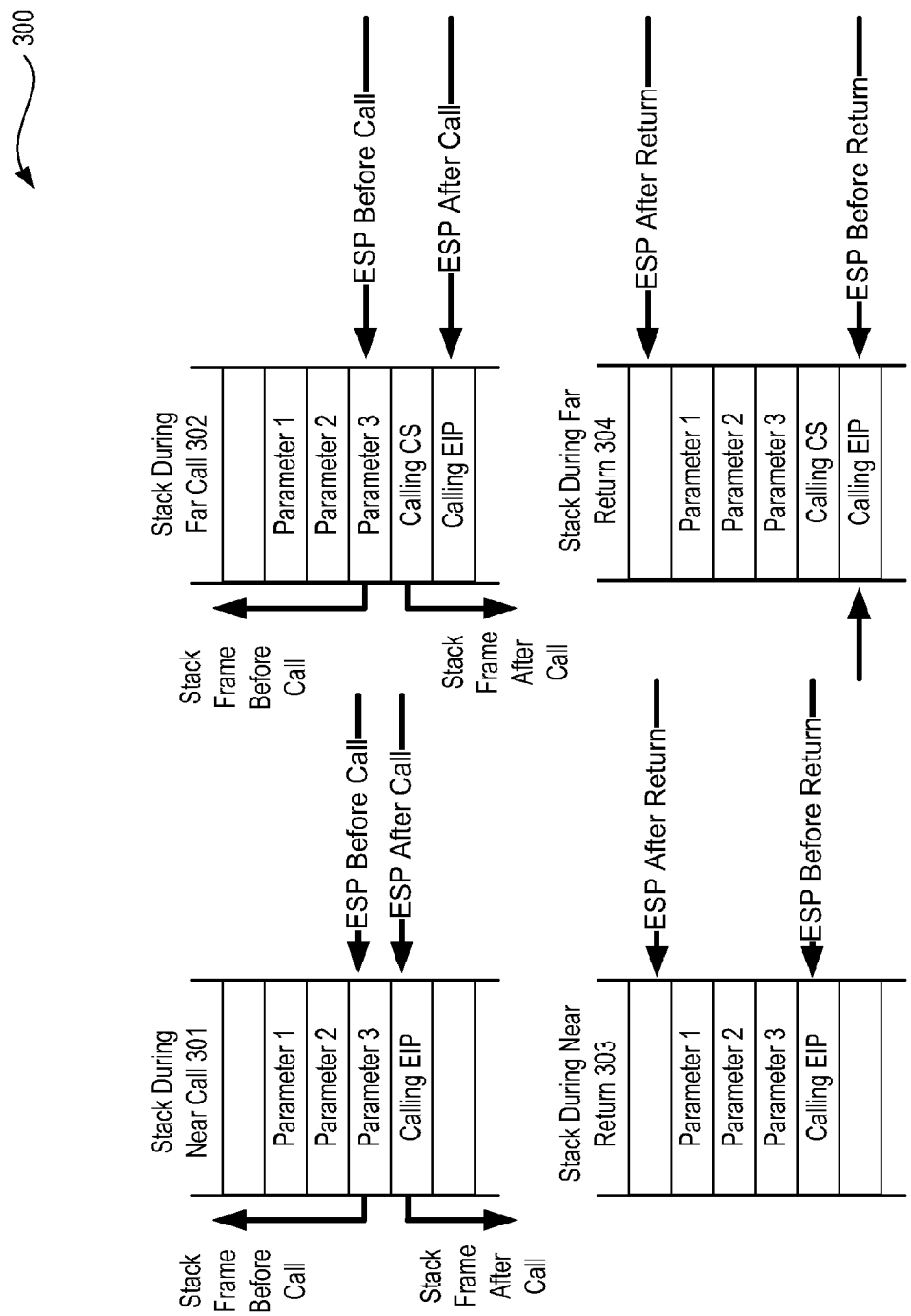
FIG. 3 illustrates an exemplary near CALL and RET using a stack.

FIG. 3 illustrates an exemplary near CALL and RET 300 using a stack. More particularly, four exemplary stacks are depicted, the stack during a near call 301, the stack during a far call 302, the stack during a near return 303 and the stack during a far return 304. Each of the stacks include several parameters (e.g., parameter 1, 2, and 3). All stacks further include a "Calling EIP" entry representing the instruction's own address. Stack during far call 302 and stack during far return 304 additionally include a "Calling CS" entry but the Stack during near call 301 and the stack during a near return 303 does not.

From stack during a near call 301 flow proceeds to either the stack frame before call or the stack frame after call and similarly from stack during far call 302 flow advances to either the stack frame before call or the stack frame after call as depicted by the outgoing arrows. Flow proceeds into the various stacks as depicted by the incoming arrows, and specifically ESP Before call and ESP after call proceeds to stack during near call 301; ESP before call and ESP after call proceeds into stack during a far call 302; ESP after return and ESP before return proceeds into stack during near return 303; and ESP after return and ESP before return proceeds to stack during far return 304. An "ESP" represents the stack pointer.

Figure 4A:
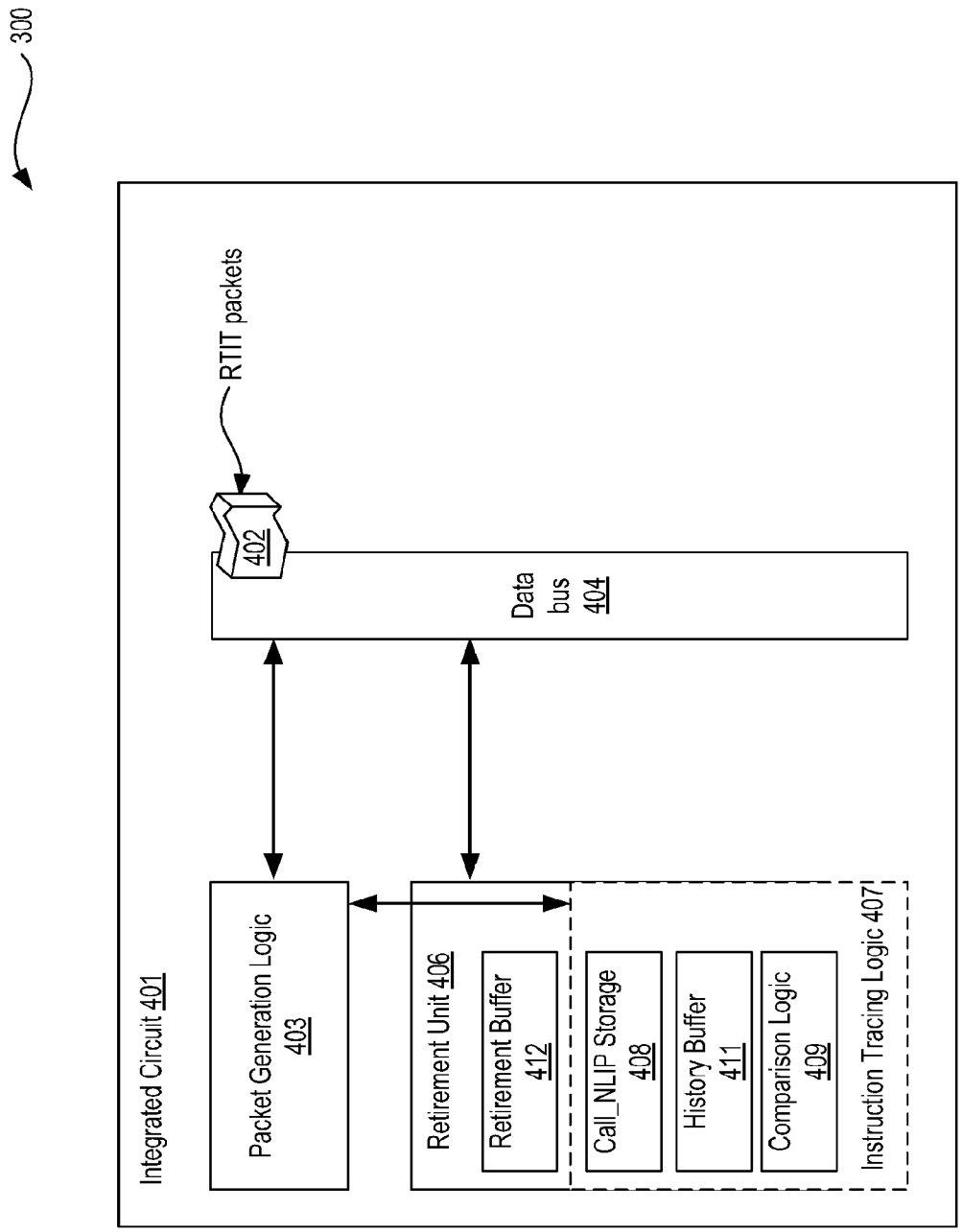
FIG. 4A illustrates an alternative exemplary architecture in accordance with which embodiments may operate.

FIG. 4A illustrates an alternative exemplary architecture in accordance with which embodiments may operate. In one embodiment, the integrated circuit 401 includes instruction tracing logic 407 to trace instructions of a traced application, mode, or code region, as the instructions are executed by the integrated circuit 401; packet generation logic 403 to generate a plurality of packets describing the traced instructions; and a retirement unit 406 to compress a multi-bit RET instruction (RETurn instruction) to a single bit RET instruction.

In one embodiment, the retirement unit 406 further includes a retirement buffer 412 and implements the instruction tracing logic 407.

In one embodiment, the retirement unit 406 includes a retirement buffer 412 and RTIT logic to implement the instruction tracing logic 407. In an alternative an embodiment, the RTIT logic implementing the instruction tracing logic 407 includes a Call_NLIP storage 408 unit, a history buffer 411, and comparison logic 409. In one embodiment, the history buffer 411 outputs packets, such as the RTIT packets 402 depicted on the data bus 404.

In one embodiment, the integrated circuit is a Central Processing Unit (CPU). In one embodiment, the central processing unit is utilized for one of a tablet computing device or a smartphone.

In accordance with one embodiment, such an integrated circuit 401 thus initiates instruction tracing (e.g., via instruction tracing logic 407) for instructions of a traced application, mode, or code region, as the instructions are executed by the integrated circuit 401; generates a plurality of packets describing the instruction tracing (e.g., via packet generation logic 403 as controlled by the instruction tracing logic 407); and compresses a multi-bit RET instruction (RETurn instruction) to a single bit RET instruction (e.g., via the retirement unit 406 and specifically via functionality of the call_NLIP storage 408 unit, the history buffer 411 and the comparison logic 409 working in conjunction with the retirement buffer 412). In one embodiment, the integrated circuit 401 compresses the multi-bit RET instruction to the single bit RET instruction by executing and retiring a near call; by further storing a linear address of an instruction following the near call; by further executing and retiring RET instruction (RETurn instruction); and by further determining whether a target address of the RET instruction matches a current call NLIP (Next Linear Instruction Pointer) entry and storing "0" when not matching and storing "1" when matching, into a history buffer; and then by determining whether the history buffer is full and sending a TNT (Taken Not Taken) packet when full and waiting until the history buffer is full when the history buffer is not full.

FIG. 4B shows a diagrammatic representation of a system 499 in accordance with which embodiments may operate, be installed, integrated, or configured.

In one embodiment, system 499 includes a memory 495 and a processor or processors 496. For example, memory 495 may store instructions to be executed and processor(s) 496 may execute such instructions. System 499 includes communication bus(es) 465 to transfer transactions, instructions, requests, and data within system 499 among a plurality of peripheral device(s) 470 communicably interfaced with one or more communication buses 465 and/or interface(s) 475. Display unit 480 is additionally depicted within system 499.

Distinct within system 499 is integrated circuit 401 which may be installed and configured in a compatible system 499, or manufactured and provided separately so as to operate in conjunction with appropriate components of system 499.

In accordance with one embodiment, system 499 includes at least a display unit 480 and an integrated circuit 401. The integrated circuit 401 may operate as, for example, a processor or as another computing component of system 499. In such an embodiment, the integrated circuit 401 of system 499 includes at least: a data bus 404, packet generation logic 403 to generate a plurality of packets describing the traced instructions; and a retirement unit 406 to compress a multi-bit RET instruction (RETurn instruction) to a single bit RET instruction.

In one embodiment, the retirement unit 406 further includes a retirement buffer 412 and implements the instruction tracing logic 407. The retirement unit 406 may further implement the packet generation logic 403 in accordance with another embodiment.

In accordance with one embodiment, such a system 499 embodies a tablet or a smartphone, in which the display unit 480 is a touchscreen interface of the tablet or the smartphone; and further in which the integrated circuit 401 is incorporated into the tablet or smartphone.

Figure 5A:
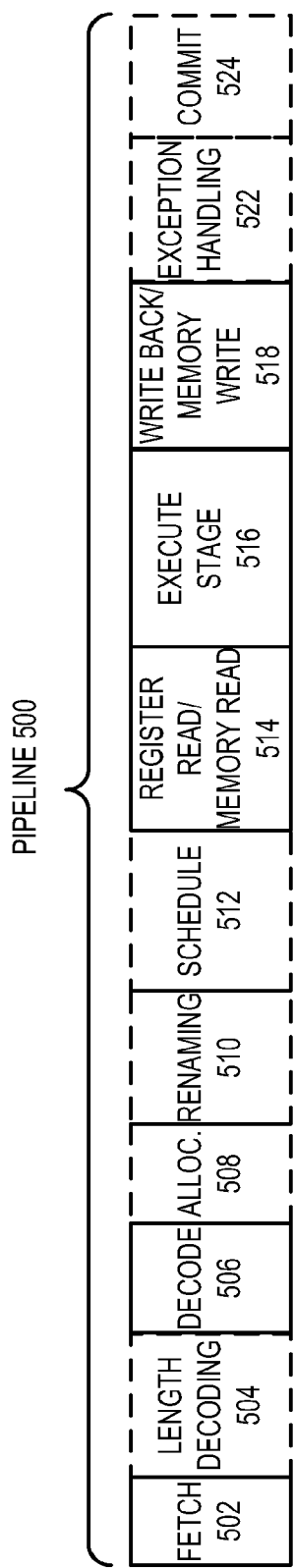
FIG. 5A is a block diagram illustrating both an exemplary in-order pipeline and an exemplary register renaming, out-of-order issue/execution pipeline in accordance with described embodiments.

FIG. 5A is a block diagram illustrating both an exemplary in-order pipeline and an exemplary register renaming, out-of-order issue/execution pipeline in accordance with described embodiments. FIG. 5B is a block diagram illustrating both an exemplary embodiment of an in-order architecture core and an exemplary register renaming, out-of-order issue/execution architecture core to be included in a processor in accordance with described embodiments. The solid lined boxes in FIG. 5A and FIG. 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
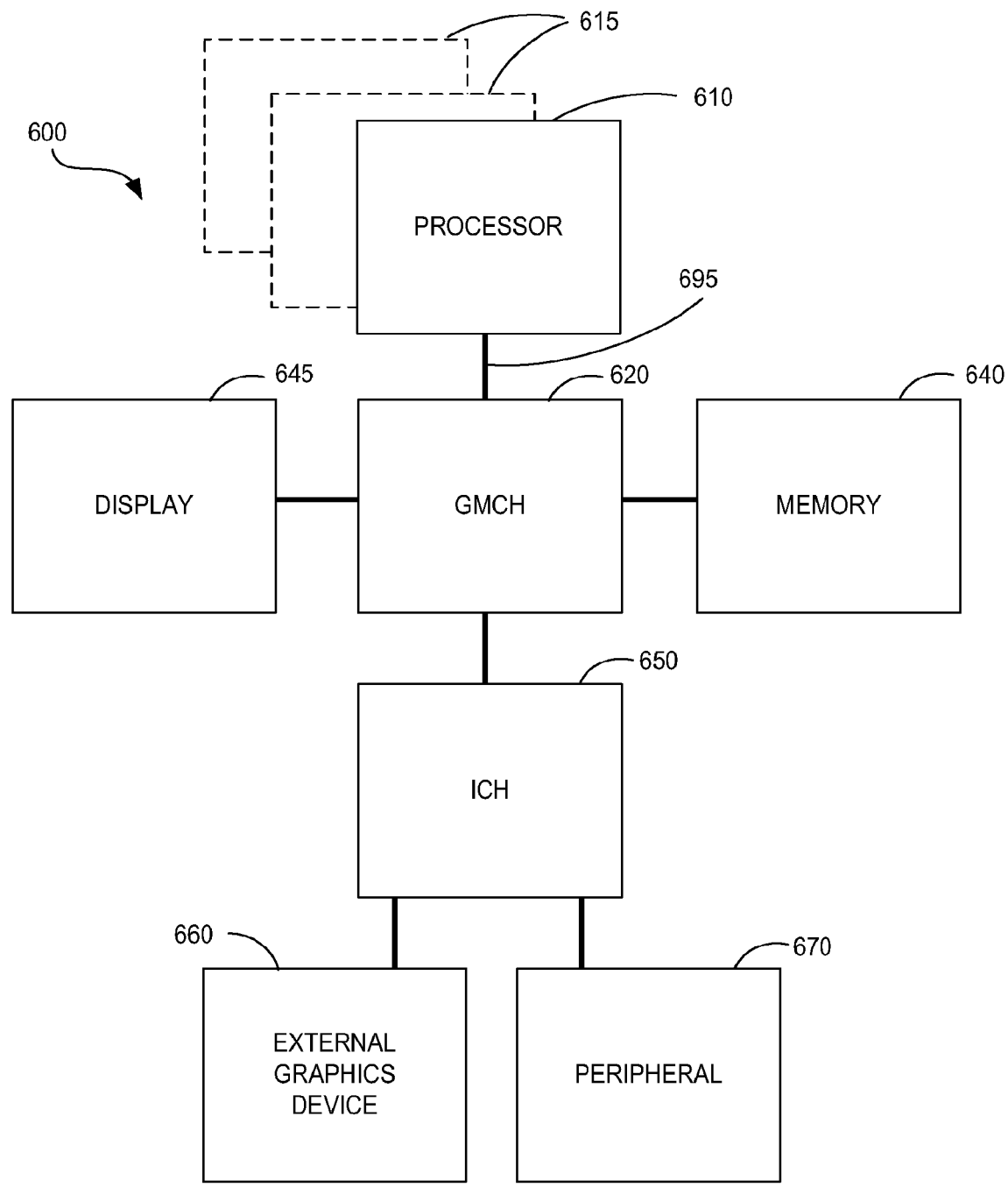
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
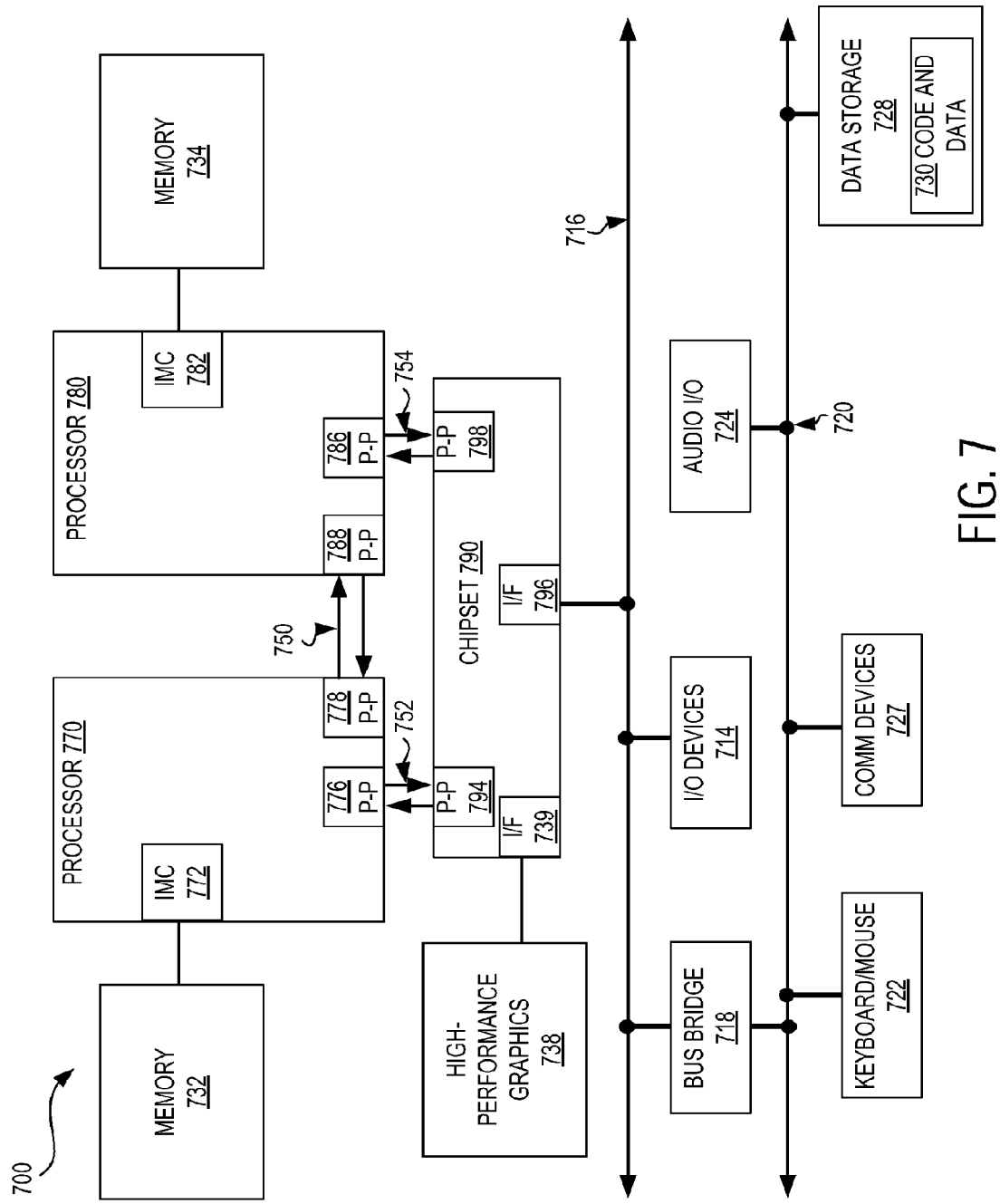
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
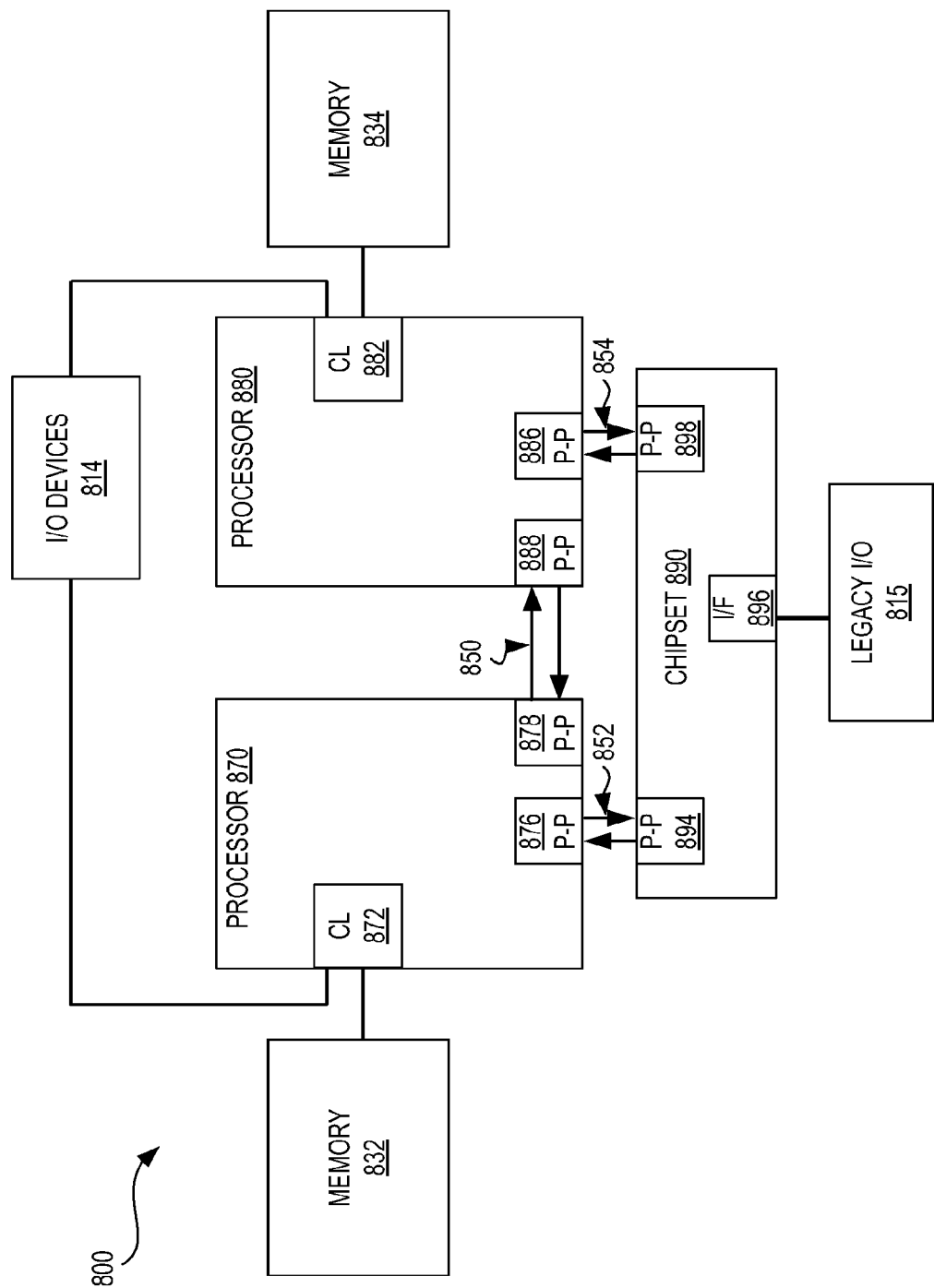
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
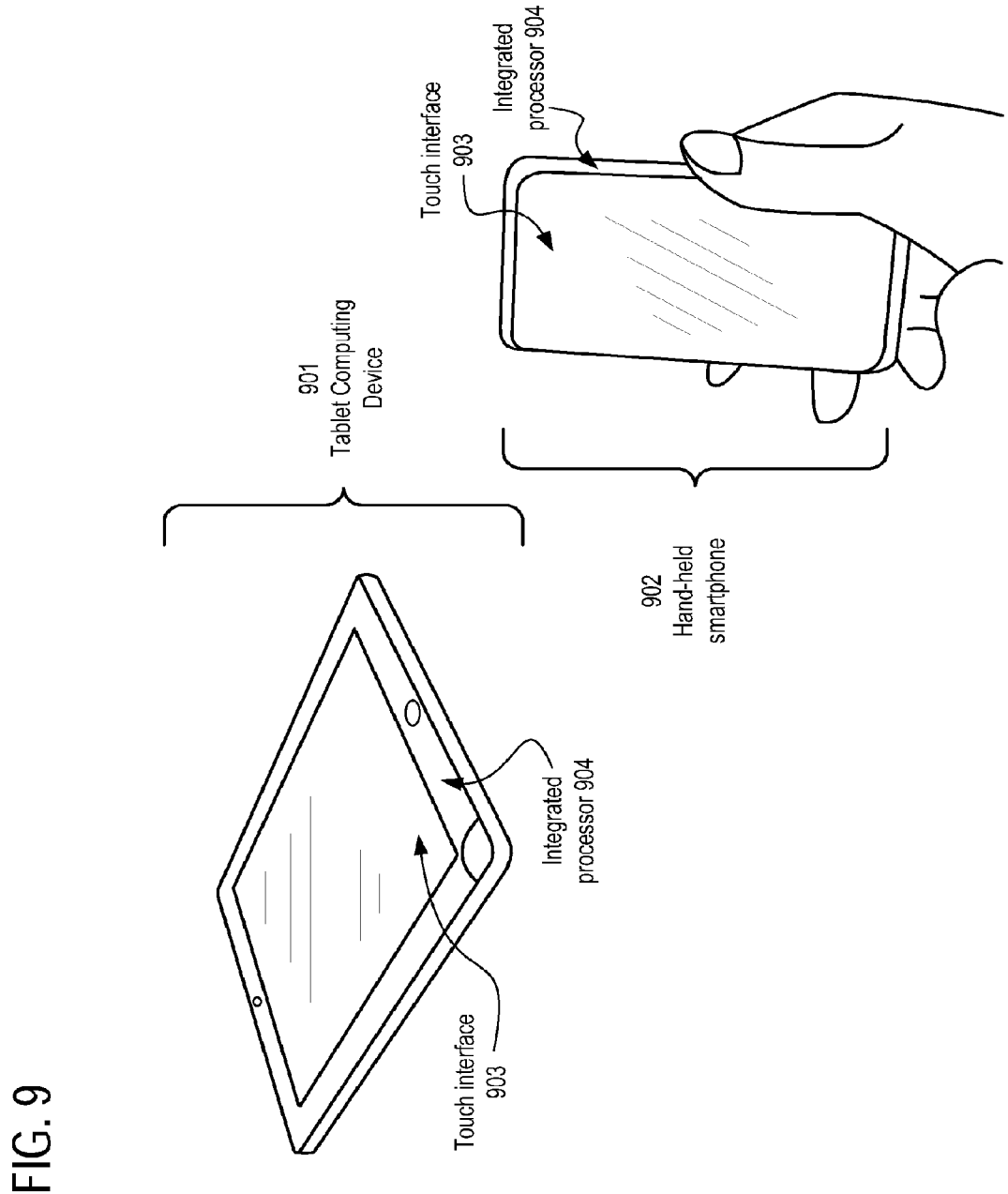
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for implementing Real Time Instruction Tracing compression of RET instructions. In one embodiment, the integrated circuit described above or the depicted integrated processor of the tablet or smartphone is an integrated silicon processor functioning as a central processing unit for a tablet computing device or a smartphone.

For example, in accordance with one embodiment, a tablet computing device includes: a display unit; and an integrated circuit which includes: a data bus, instruction tracing logic to trace instructions of a traced application, mode, or code region, as the instructions are executed by the integrated circuit packet generation logic to generate a plurality of packets describing the traced instructions; and a retirement unit to compress a multi-bit RET instruction (RETurn instruction) to a single bit RET instruction.

Figure 10:
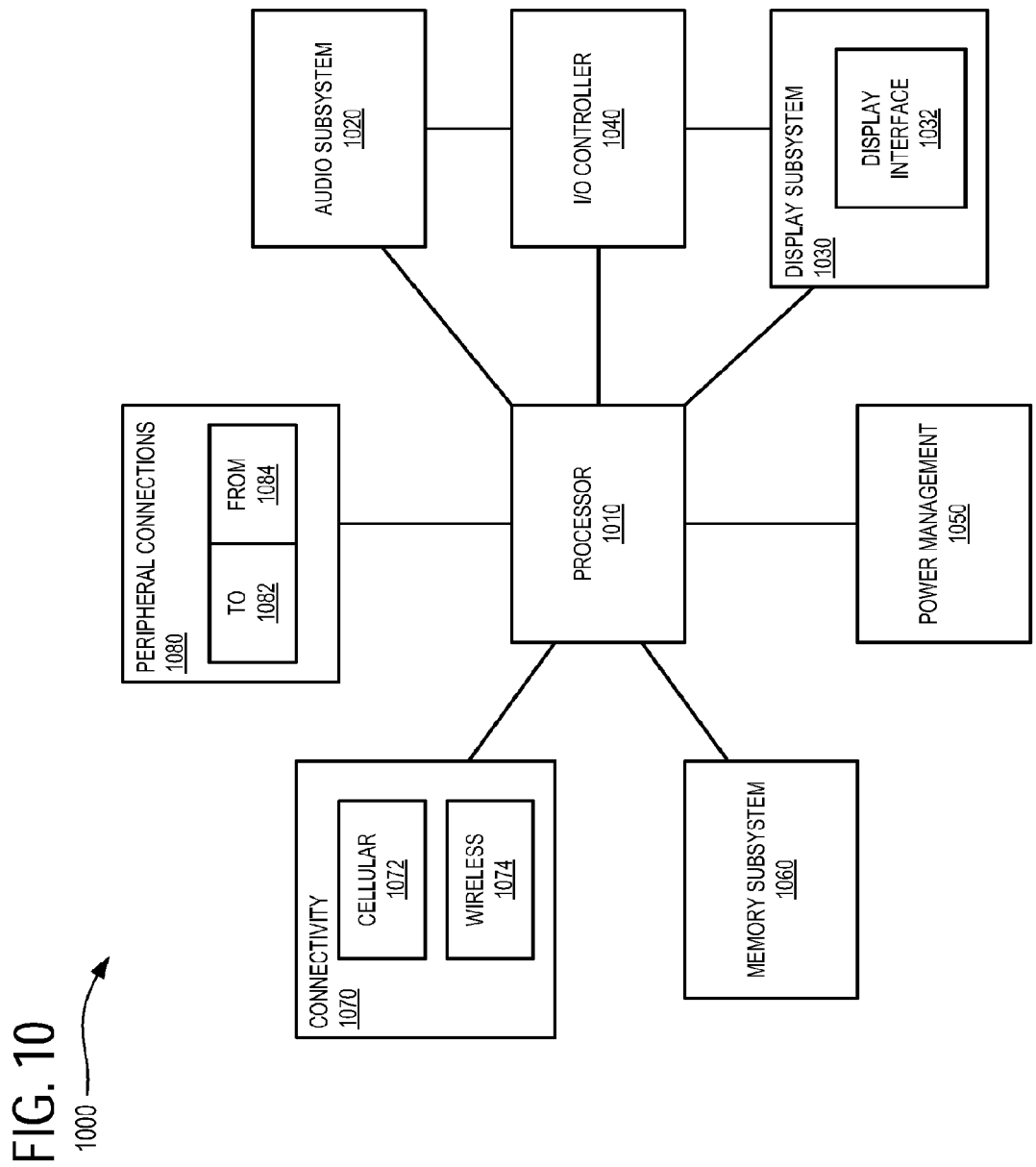
FIG. 10 is a block diagram of an embodiment of tablet computing device, a smartphone, or other mobile device in which touchscreen interface connectors are used.

FIG. 10 is a block diagram 1000 of an embodiment of tablet computing device, a smartphone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 1010.

Display subsystem 1030 represents hardware (e.g., display devices) and software (e.g., drivers) components that provide a visual and/or tactile display for a user to interact with the tablet computing device or smartphone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smartphone through which a user might interact. In one embodiment, I/O controller 1040 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 1050 that manages battery power usage, charging of the battery, and features related to power saving operation. Memory subsystem 1060 includes memory devices for storing information in the tablet computing device or smartphone. Connectivity 1070 includes hardware devices (e.g., wireless and/or wired connectors and communication hardware) and software components (e.g., drivers, protocol stacks) to the tablet computing device or smartphone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smartphone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
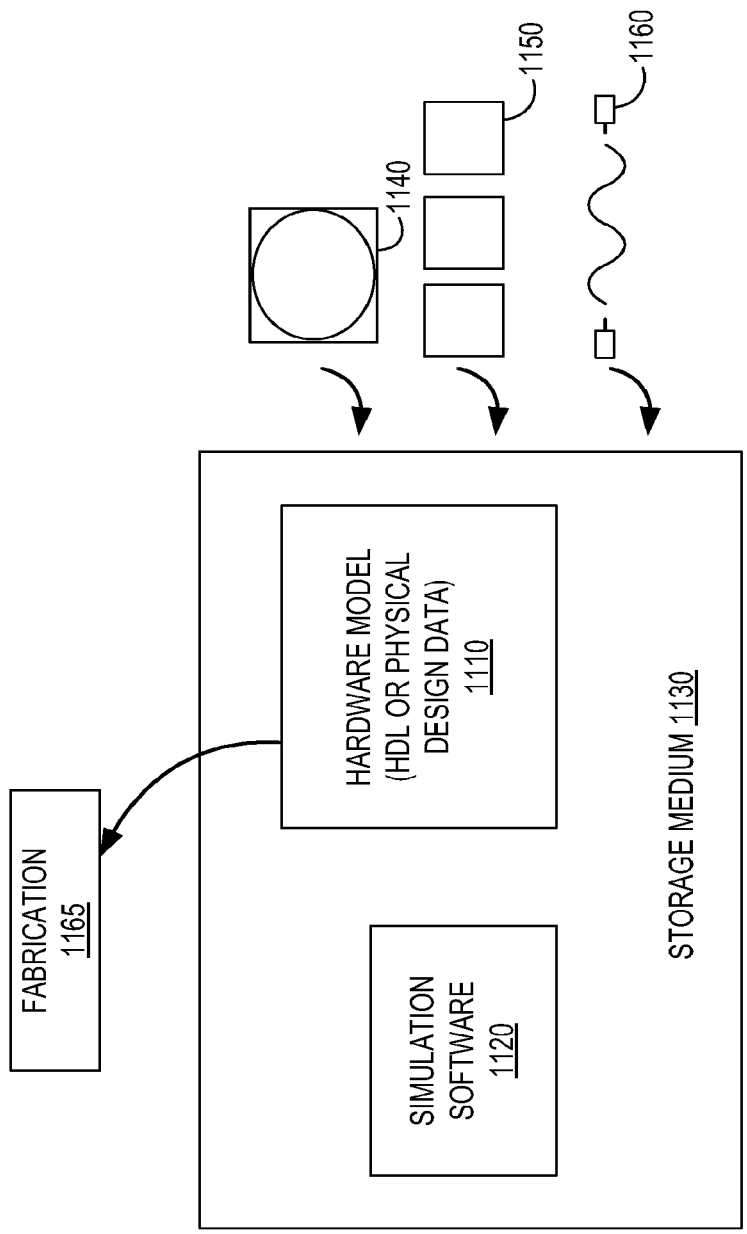
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
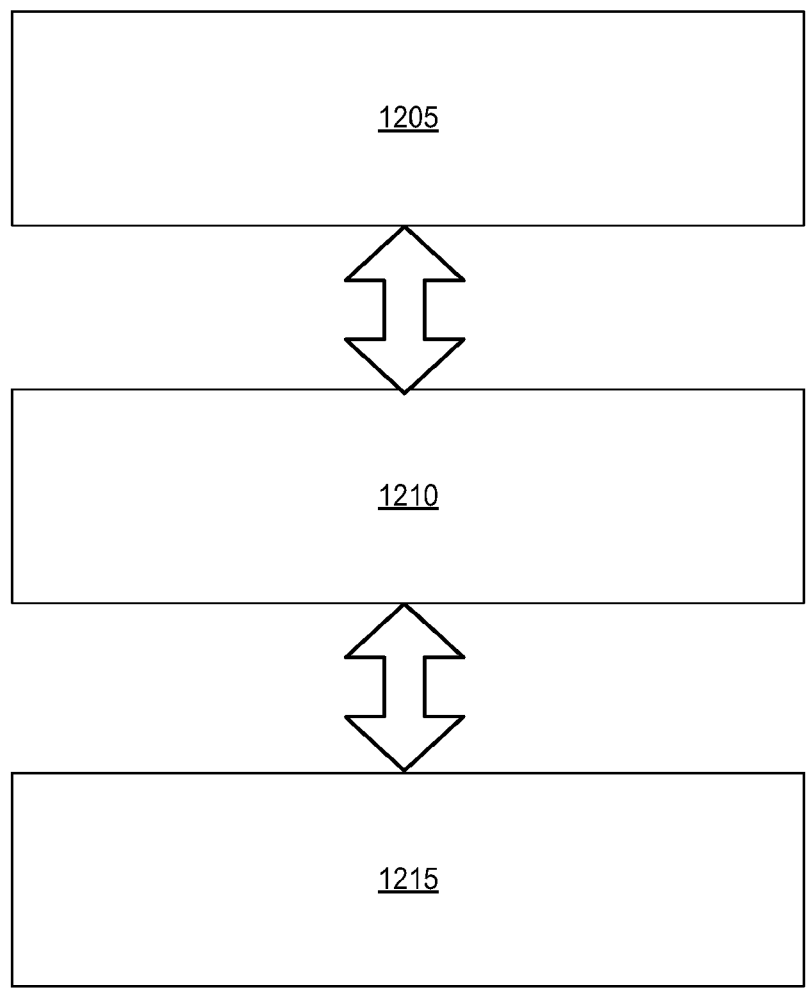
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in an integrated circuit, wherein the method comprises:
   initiating instruction tracing for instructions of a traced application, mode, or code region, as the instructions are executed by the integrated circuit;
   generating a plurality of packets describing the instruction tracing; and
   compressing a multi-bit RET instruction (RETurn instruction) to a single bit RET instruction.

2. The method of claim 1, wherein compressing the multi-bit RET instruction to the single bit RET instruction comprises:
   the integrated circuit executing and retiring a near call;
   the integrated circuit storing a linear address of an instruction following the near call;
   the integrated circuit executing and retiring RET instruction (RETurn instruction);
   determining whether a target address of the RET instruction matches a current call NLIP (Next Linear Instruction Pointer) entry and storing "0" when not matching and storing "1" when matching, into a history buffer; and
   determining whether the history buffer is full and sending a TNT packet (Taken-Not-Taken packet) when full and waiting until the history buffer is full when the history buffer is not full.

3. The method of claim 1, wherein the multi-bit RET is one of a 24-bit or a 56-bit return instruction.

4. The method of claim 1, wherein the multi-bit RET instruction comprises an indirect jump whose target address is popped from a stack.

5. The method of claim 2, wherein the near call comprises a CALL instruction representing a direct jump, wherein the CALL instruction pushes a RET address for the multi-bit RET instruction onto a stack in a memory.

6. The method of claim 5, wherein the CALL instruction is callable from multiple places within a program and wherein exiting the called CALL instruction exists a called function back to a calling program with the multi-bit RET instruction.

7. The method of claim 5, wherein the CALL instruction transfers control to procedures within a current code segment near the CALL instruction a near CALL or to a different code segment as a far CALL.

8. The method of claim 7, wherein the near CALL provides access to local procedures within a currently running program or task.

9. The method of claim 7, wherein the far CALL provides access to operating system procedures or procedures in a different task from a task or program from which the CALL instruction is initiated.

10. The method of claim 5, wherein the CALL instruction pushes an instruction pointer (IP) of a next sequential instruction onto a stack in a memory and further wherein a corresponding RET pops the instruction pointer from the stack and jumps to it causing the execution to continue after call.

11. The method of claim 5:
    wherein the CALL instruction pushes an instruction pointer (IP) of a next sequential instruction onto a stack in a memory and further wherein a corresponding RET pops the instruction pointer from the stack;
    wherein the method further comprises a subroutine to adjust the instruction pointer in the stack by jumping to the caller of the CALL instruction or by modifying the corresponding RET in the stack triggering the RET to jump to an address pushed onto the stack by the corresponding CALL instruction.

12. The method of claim 11, wherein the corresponding RET corresponds to the multi-bit RET instruction.

13. The method of claim 5, wherein the CALL instruction is a near CALL and wherein an entry is responsively made into a CALL_NLIP entry storage unit.

14. The method of claim 1, wherein compressing the multi-bit RET instruction to the single bit RET instruction comprises:
    saving a linear address of a next instruction after a near CALL instruction into a storage mechanism when the near CALL instruction retires as an entry into a CALL_NLIP entry storage unit.

15. The method of claim 14, wherein the linear address saved is an NLIP (Next Linear Instruction Pointer) entry corresponding to an effective address that is pushed onto a stack in memory.

16. The method of claim 14, wherein the linear address saved comprises an IP/EP+CS.base or an RIP of a next instruction.

17. The method of claim 2, further comprising:
marking all CALL_NLIP entries as invalid after Prefetch Stream Buffer (PSB) packets enabling an analyzing program for the instruction trace to interpret the instruction trace regardless of whether instruction trace output before the PSB is lost.

18. The method of claim 17, further comprising:
updating entries for CALL and RET instructions only when the CALL and RET instructions correspond to a specified mode and/or region to generate instruction tracing packets.

19. The method of claim 18, wherein the specified mode and/or region is based at least in part on one or more of a privilege level of a system.

20. The method of claim 1, wherein the integrated circuit comprises a Central Processing Unit (CPU).

21. The method of claim 1, wherein the integrated circuit comprises a central processing unit for one of a tablet computing device or a smartphone.

22. The method of claim 1, wherein initiating instruction tracing comprises initiating Real Time Instruction Tracing (RTIT) for the instructions of the traced application, mode, or code region, as the instructions are executed by the integrated circuit.

23. An integrated circuit comprising:
instruction tracing logic to trace instructions of a traced application, mode, or code region, as the instructions are executed by the integrated circuit;
packet generation logic to generate a plurality of packets describing the traced instructions; and
a retirement unit to compress a multi-bit RET instruction (RETurn instruction) to a single bit RET instruction.

24. The integrated circuit of claim 23, wherein the retirement unit comprises a retirement buffer and implements the instruction tracing logic.

25. The integrated circuit of claim 23, wherein the retirement unit comprises:
a retirement buffer and
RTIT logic to implement the instruction tracing logic; and
wherein the RTIT logic comprises:
a CALL_NLIP entry storage unit;
comparison logic; and
a history buffer to output RTIT packets.

26. The integrated circuit of claim 23, wherein the integrated circuit comprises a Central Processing Unit (CPU).

27. The integrated circuit of claim 23, wherein the integrated circuit comprises a central processing unit for one of a tablet computing device or a smartphone.

28. A system comprising:
a display unit; and
an integrated circuit, wherein the integrated circuit comprises:
a data bus,
instruction tracing logic to trace instructions of a traced application, mode, or code region, as the instructions are executed by the integrated circuit;
packet generation logic to generate a plurality of packets describing the traced instructions; and
a retirement unit to compress a multi-bit RET instruction (RETurn instruction) to a single bit RET instruction.

29. The system of claim 28:
wherein the system embodies a tablet or a smartphone;
wherein the display unit comprises a touchscreen interface of the tablet or the smartphone; and
wherein the integrated circuit is incorporated into the tablet or smartphone.

30. A tablet computing device comprising:
a display unit; and
an integrated circuit, wherein the integrated circuit comprises:
a data bus,
instruction tracing logic to trace instructions of a traced application, mode, or code region, as the instructions are executed by the integrated circuit;
packet generation logic to generate a plurality of packets describing the traced instructions; and
a retirement unit to compress a multi-bit RET instruction (RETurn instruction) to a single bit RET instruction.

* * * * *